Jan. 25, 1966     L. D. O. TEARNE     3,231,218
PNEUMATIC TUBE SYSTEMS
Filed Oct. 16, 1962     4 Sheets-Sheet 2
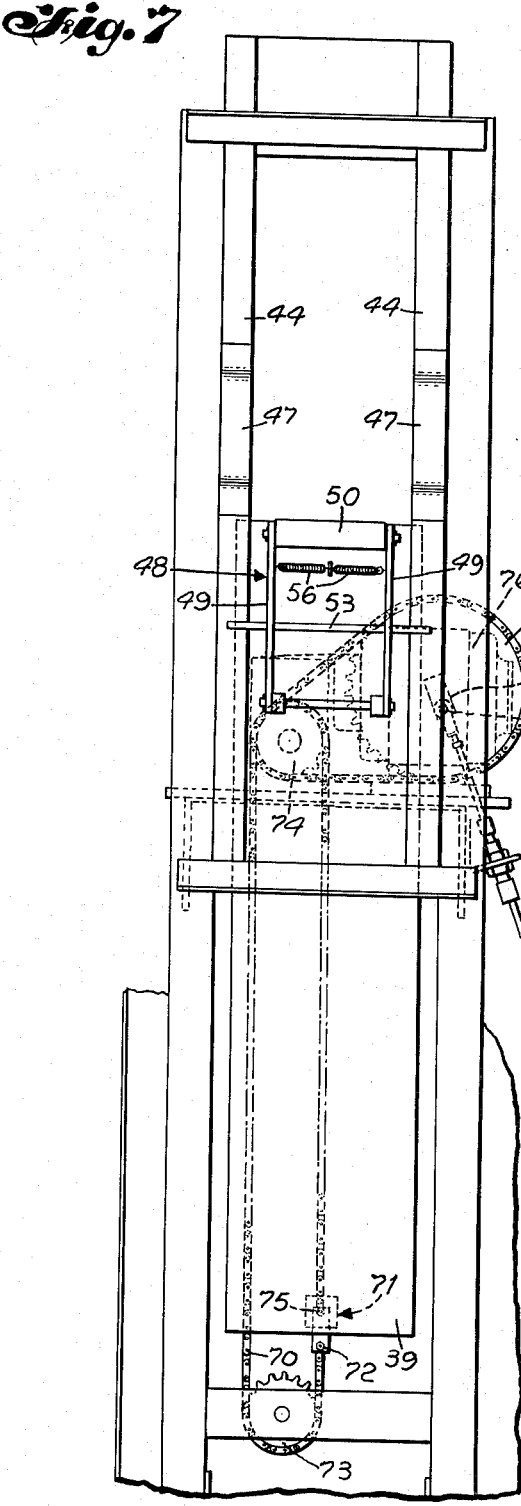
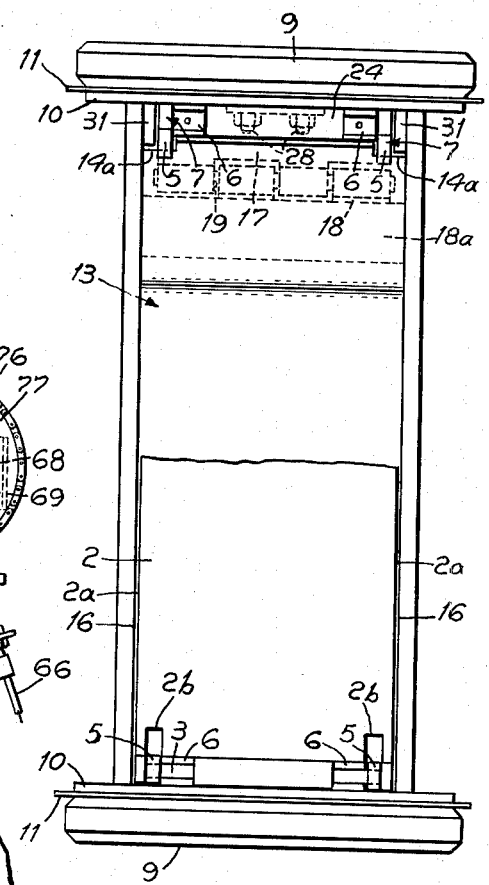
INVENTOR.
LEWIS D. O. TEARNE
ATTORNEY Jan. 25, 1966  L. D. O. TEARNE  3,231,218
PNEUMATIC TUBE SYSTEMS Filed Oct. 16, 1962  4 Sheets-Sheet 3

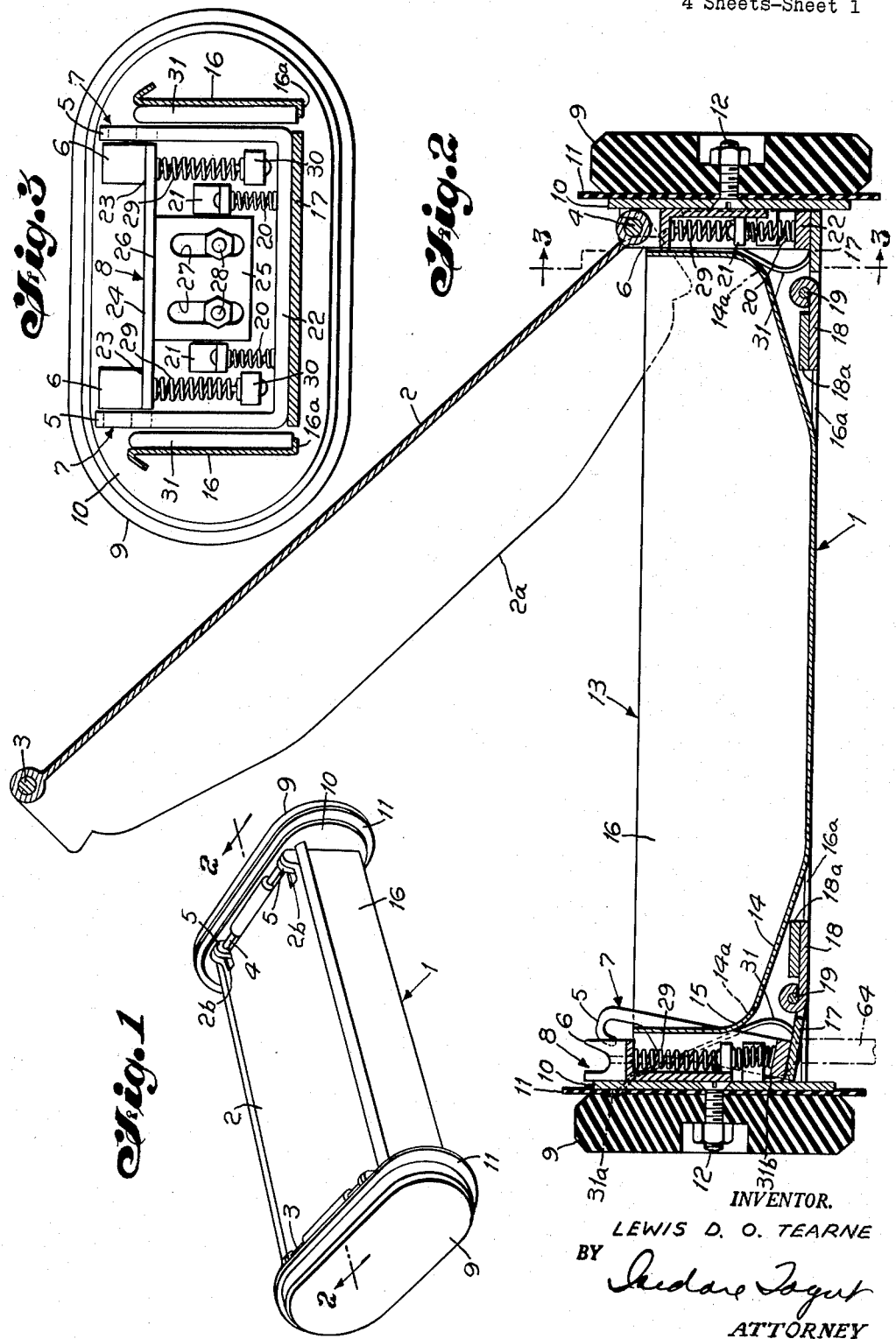

INVENTOR.
LEWIS D. O. TEARNE
BY Isidore Togut
ATTORNEY

Jan. 25, 1966 L. D. O. TEARNE 3,231,218
PNEUMATIC TUBE SYSTEMS
Filed Oct. 16, 1962 4 Sheets-Sheet 4
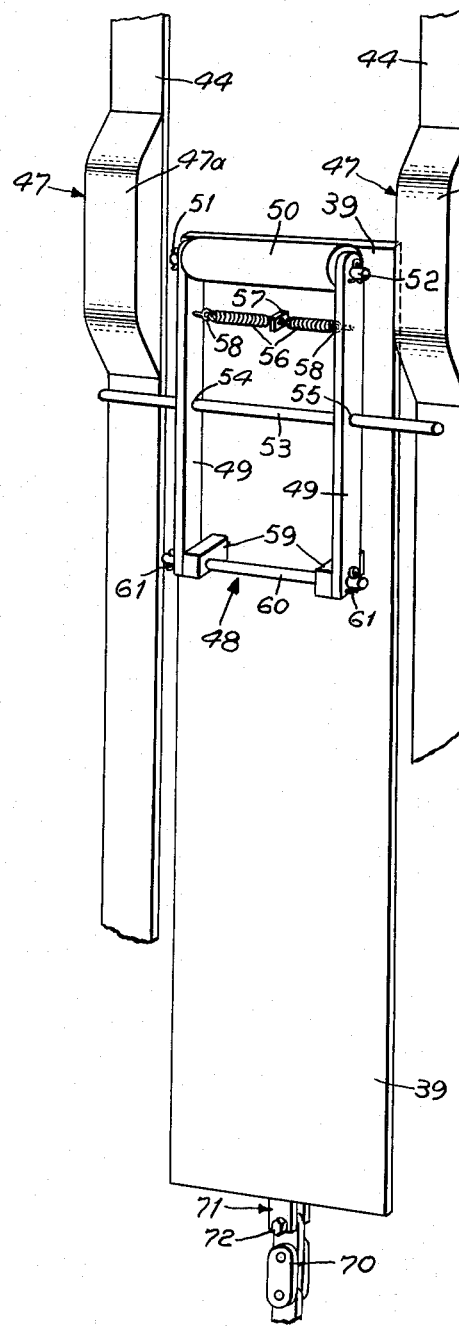
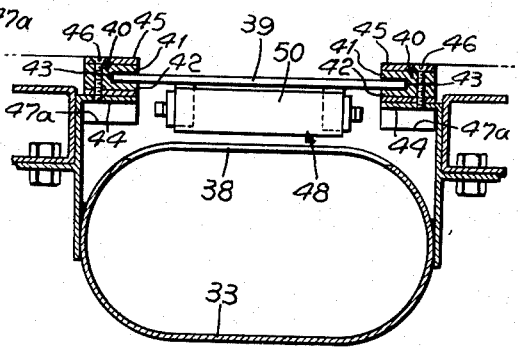
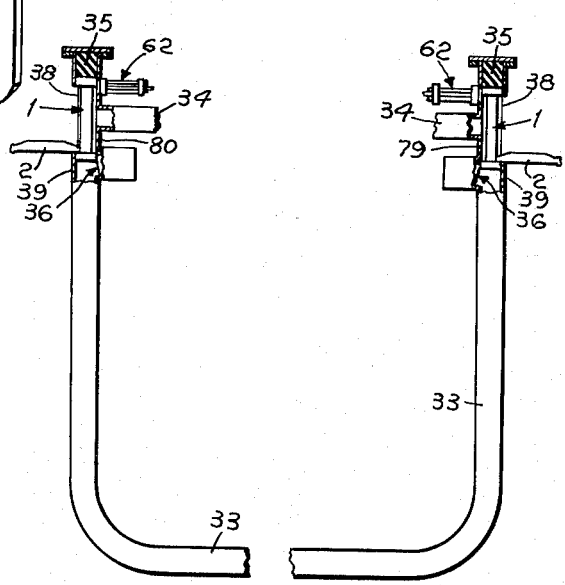
INVENTOR.
LEWIS D. O. TEARNE
BY
ATTORNEY

United States Patent Office 3,231,218
Patented Jan. 25, 1966

---

3,231,218
PNEUMATIC TUBE SYSTEMS
Lewis D. O. Tearne, Montvale, N.J., assignor to International Telephone and Telegraph Corporation, Nutley, N.J., a corporation of Maryland
Filed Oct. 16, 1962, Ser. No. 230,845
14 Claims. (Cl. 243—34)

This invention relates to pneumatic tube systems and more particularly to pneumatic tube systems for use in drive-in service apparatus for the transaction of business between customers on the sidewalks or in parked cars and persons within a business structure.

A pneumatic tube system in accordance with my invention is especially useful in a drive-in service apparatus of the type disclosed in Patent No. 2,912,066. All pneumatic tube systems comprise as many safeguards as possible to insure that articles contained in carriers do not fall out of the carriers while in transit. The articles may be damaged by subsequent carriers and may clog up the system as they usually tend to accumulate in a specific position of the tube due to the air pressure in the tube and the structure of the system. Removal of such an accumulation is extremely difficult as entrance must be made into the forwarding tube itself. Often the portion of the tube which must be reached is within the walls of the building in which the pneumatic tube system is housed. In systems for use in auto-banks, safety is especially important as confidence in the system must be instilled in customers who are to use the system for the deposit of their money. Systems of the type for use in auto-bank or drive-in services usually use a carrier which cannot be removed from the forwarding tube system at the customers' end in order to prevent customers from forgetting to replace the carrier or from causing extraneous matter to be inserted into the forwarding tube itself. Carriers for use in present pneumatic tube systems may be opened by applying pressure to one side of the carrier or one portion of the carrier, for instance, a push button, hook, or latch. Latches or covers of carriers may be snapped open due to the force of a collision with either other carriers in the system or shock absorbers which are installed at the stations in the system. Another danger to carriers which may be opened by applying pressure to one portion of the carriers is the application of centrifugal force to the carrier when it traverses a bend in the forwarding tube system. In present drive-in service apparatus, the teller must remove the carrier from the system, open the carrier, close the carrier, and then replace the carrier in the system. Not only is time and effort lost but there is the danger of the insertion of extraneous material into the system, or that the teller will not remember to close the carrier before inserting it into the system.

It is therefore an object of my invention to provide a carrier for use in a pneumatic tube system having positive closure means which requires forces to be applied simultaneously in more than one direction for the closure means to be opened.

It is another object of my invention to provide a carrier for use in pneumatic tube systems which need never be removed from the system.

It is a further object of my invention to provide a pneumatic tube system which incorporates means for automatically closing a carrier before it leaves a station.

It is still another object of my invention to provide a pneumatic tube system having apparatus which will automatically open a carrier upon arrival at a station, the carrier having closure means which requires the application of force in more than one direction to open the closure means.

It is yet another object of my invention to provide a carrier for use in pneumatic tube systems which can be opened at either of its two ends.

A feature of my invention is a carrier having a cover with shafts on either end which are pivotally held by co-operating hooked and slotted members of the carrier which will only release their hold if forces are applied in two oppositely disposed directions to the carrier.

Another feature of my invention is apparatus for opening and closing a carrier having a closure device which requires the application of force in more than one direction to effect an opening or closing of the device. The apparatus comprises roller means which cooperate with the sliding doors that permit access to the system at the stations to apply force to one surface of the carrier when the door is either opened or closed and reciprocating means which cooperate with the movement of the sliding door to apply force to the opposite surface of the carrier at a predetermined time.

The above-mentioned and other objects and features of this invention will become more apparent by reference to the following description taken in conjunction with the accompanying drawings, in which:

FIGURE 1 is a perspective view of a carrier in accordance with my invention, the cover of the carrier being in the closed position;

FIGURE 2 is a longitudinal cross-sectional view of the carrier of FIGURE 1 taken along the lines 2—2, but with the cover of the carrier in the open position;

FIGURE 3 is a cross-sectional view of the carrier of FIGURE 2 taken along the lines 3—3;

FIGURE 4 is a plan view of the carrier of FIGURE 1 with a portion of the cover 2 removed;

FIGURE 6 is a cross-sectional view taken along the lines 6—6 of FIGURE 5;

FIGURE 7 is a rear view of the station of FIGURE 5 with the back of the forwarding tube removed;

FIGURE 8 is a perspective view of a door and cooperating means for exerting pressure on a carrier in accordance with my invention; and FIGURE 9 is a schematic representation of a pneumatic tube system for use in a drive-in service in accordance with my invention.

Figure 5:
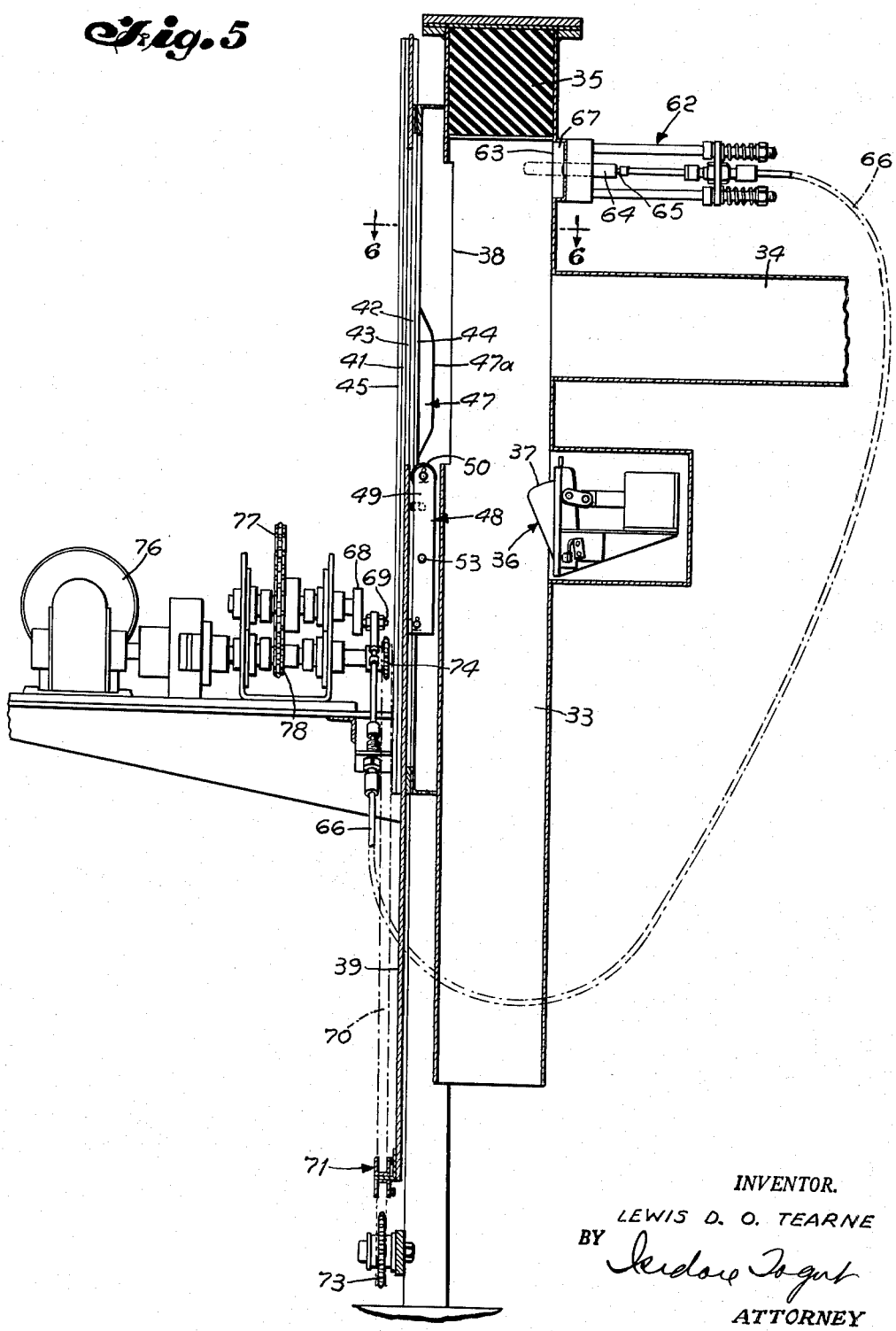
FIGURE 5 is a cross-sectional view of a station of a pneumatic system in accordance with my invention.

Referring now to FIGURES 1, 2, 3, and 4 in which there is disclosed a carrier in accordance with my invention, there is shown a carrier 1 which has a symmetrically shaped cover 2. The cover 2 is a U-shaped member with sidewalls 2a and shafts 3 and 4. The cover 2 is pivotally retained at both ends by means of hooks 5 and locking forks 6 of the hooked members 7 and fork members 8 respectively. The hooks 5 cooperate with the locking forks 6 to effect a 360° hold on each of the shafts 3 and 4. Bumpers 9 are secured to an end plate 10 through air flaps 11 by means of the bolts 12. The receptacle 13 includes a bottom plate 14 with turned up ends 15 and side plates 16 welded to the bottom plate 14 along the edges 16a to form a container. The side walls 2a of the cover 2 fit into slots 14a in the receptacle when the carrier is closed. A hook release plate 17 is hinged to a support 18 by pin 19. The support 18 is welded to the bracket 18a which is welded to the sides 16 (FIGURES 2 and 4). Springs 20 are fastened to a support 21 at one end so that the other end exerts pressure on the base 22 of the hooked members 7. Thus the hook release plate 17 and the base 22 of the hooked member 7 are normally perpendicular to the end plate 10. The forks 6 are welded at their bases 23 to the bar 24 of fork member 8 which is welded to the plate 25 at 26. The plate 25 has slots 27 which cooperate with bolts 28 welded to end plate 10 to allow movement of the fork members 8 parallel to the end plates 10 and perpendicular to the supports 18. Springs 29 are supported at one end by a support 30 which is welded to end plate 10 and each spring is connected to a bar 24 to force the forked members 8 to their highest vertical position with respect to the support 18. It can be clearly seen in FIGURE 2 that the hooks 5 and the locking forks 6 completely encircle the shaft 4. Flat springs 31 connected to end plates 10 at 31a and 31b are positioned in the slots 14a to force an end of the cover 2 away from the receptacle 13 when the shaft associated with that end is released from the hold of the hooks 5 and forks 6. The carrier 1 rests on one of its bumpers 9 when it is in a station. Thus the carrier 1 shown in FIGURE 2 would be resting on the bumper 9 adjacent the shaft 4 in order for the cover 2 to be in the position shown. The projections 2a press against the springs 31 when held in the slots 14a by the cooperating hooks 5 and forks 6. In FIGURE 2 when the shaft 3 is released, the springs push the end associated with the shaft 3 away from the carrier. The springs 31 need only push the cover 2 sufficiently to move its center of gravity past the shaft 4 which pivotally supports the cover 2 so that the cover 2 will fall free of the carrier. The cover 2 will rest on the door of the station in which it is opened (FIGURE 9).

The forked members 8 due to the spring action of the springs 29 tend to hold the shafts 3 and 4 securely within the hooks 5 so that the shafts 3 and 4 are prevented from moving in a direction perpendicular to the end plate 10. In order for the carrier to be opened at either of its identical ends, the hooks 5 of a hooked member 7 must be moved from their position over one of the shafts 3 or 4 so that the shaft may be lifted out of forks 6 of the fork member 8. This lifting will be effected by the springs 31. The cover may be designed so that the center of gravity falls on the side of the shaft opposite the carrier and then without springs 31 it will fall free of the forks when it is resting on one of the bumpers 9 and the hooks are moved out of its way. In order for a hooked member 7 to be moved into the position shown in FIGURE 2, the shaft 3 must be depressed so that the ends of the hooks 5 will clear the shaft 3. It is to be noted that the hook 5 encompasses 180° of the shaft 3. Hooks which encompass much less tend to be jarred loose of the shafts they hold upon collisions with other carriers or with shock absorbers.

The procedure for opening the carrier at either end is identical. First, the shaft must be pushed down out of the hooks. Next, while the shaft is in this position, the hooks 5 must be moved towards the center of the carrier into slots 2b so that they are no longer above the shaft. The depressing force is then released from the shaft and the springs 31 will lift the shaft clear of the forks 6. This is accomplished by applying force to the cover to depress the shafts and simultaneously applying force to the hook release plate 17 to move the hooks 5 towards the center of the carrier.

Referring now to FIGURES 5, 6 and 7 which are cross-sectional views of a pneumatic tube station in accordance with my invention there is shown a forwarding tube line 33 which is pneumatically connected to a source of air pressure (not shown) by means of the air line 34. Carriers entering the station travel in a vertical direction and hit the shock absorber 35. The stop 36 normally rests in the position shown so that carriers which are above it rest on the edge 37. Carriers in passing upwards through the tube trip the stop 36 and move it out of the path of the carriers and then the stop 36 automatically falls back into the position shown to hold the carriers adjacent the opening 38 in the forwarding tube section. The stop 36 is released by an operator, usually a bank teller, when it is desired to move the carrier to another station. The door 39 is slidably mounted between the walls 41 and 42 of the bearing 40 (FIGURE 6). The bearing 40 is made of a specially prepared durable wood which has been impregnated with oil so that it is lubricated for the life of its use and will permit the door 39 to slide easily in the tracks 43. The bearing 40 is rigidly held between the wall 44 and the metal reinforcing strip 45 by means of the screws 46. Cam members 47 are rigidly attached to the wall 44 (by means not shown) so that their surfaces are parallel to each other.

The assembly 48 (FIGURES 5, 6, 7, and 8) is provided for applying a force perpendicular to the cover of a carrier to be opened to depress the shafts 3 and 4 so that they are moved out of engagement with the hooks 5. It consists of bars 49, a roller 50 rotatably mounted between the bars 49 at 51 and 52, a shaft 53 rigidly attached to the bars 49 at 54 and 55, and springs 56 for drawing the assembly 48 towards the door 39 which are attached to the back of the door at 57 and to the bars 49 by means of the hooks 58. Supports 59 pivotally support the bars 49 by means of shaft 60 which is journaled through the supports 59. The bars 49 are held in place by cotter pins 61. The shaft 53 may be journaled through the bars 49.

A push-pull device 62 (FIGURE 5) is mounted adjacent the aperture 63 in the forwarding tube wall. The push-pull device 62 consists of a plunger 64 rigidly connected to a wire-like inner member 65 which is slidably mounted in flexible cable 66. The direction of travel of the plunger 64 is controlled by guide 67. The member 65 is connected at its other end to crank arm 68 by means of stud 69. When the carrier 1 is resting on the stop 36 the plunger 64 is disposed adjacent the hook release plate 17. A sprocket chain 70 (FIGURES 5 and 7) is rigidly fastened to the door 39 by means of fastener 71 at 72 and travels over idler 73 to drive pulley 74 and then back to the fastener 71 and is connected to it at 75.

A buzzer (not shown) is provided for bank customers. Motor 76 is activated by a teller in the bank when a customer buzzes for service. Gear 77 which drives the crank arm 68 has a four to one ratio in the number of teeth on its diameter to the number of teeth on gear 78 which drives the chain 70 via the pulley 74. Two turns of the gear 78 are required to move the door 39 so that the door completely clears the opening 38. Thus, the gear 77 moves 180° during the opening. Since the stud 69 is mounted eccentrically on the crank arm 68, its movement will follow a sine function. When the crank arm 68 has moved 180°, the plunger 64 will be extended its maximum distance into the forwarding tube 33 as shown by the broken line outline. The entire time that the shaft 53 of the assembly 48 rides over the surfaces 47a of the cams 47 which are parallel to the wall 44, the cover 2 is depressed sufficiently so that the shafts 3 and 4 are out of engagement with the hooks 5. During this time the plunger 64 traverses the portion of a sine wave between 115° and 165° of its forward travel into the pneumatic tube 33 and depresses the hook release plate 17 which is pivoted on pin 19 sufficiently (FIGURE 2) to move the hooks 5 out of the way of the shaft 3 or 4 (as the case may be) during this interval. During the last 15° of travel of the crank arm 68, the roller 50 moves out of contact with the cover 2 allowing the springs 31 to force the cover away from the open portion of the carrier and out of the opening 38. The motor 76 automatically stops when the door is in the position shown in FIGURE 5. When a customer signals that he is done with the carrier or tells the teller through an audio and/or video communication system that he is done, the operator activates the motor 76 in the reverse direction so that the door 39 is moved over the opening 38. The movement of the roller 50 over the cam member 47 causes the cover to be lifted back into its position over the carrier compartment. The roller forces the cover and the shafts 3 and 4 toward the supports 18 depressing the forked members 8 and causing the shafts 3 and 4 to again be clear of the hooks 5. During this time the plunger 64 is withdrawn from the tube allowing the springs 20 to force the hooked member towards the end plate 10 so that the hooks 5 are again above the shaft.

As the door moves further over the opening 38, the roller 50 moves out of contact with the cover 2 and allows the shafts 3 and 4 to move into the hooks 5 and the forked members 8 to move upwards so that the forks 6 cooperate with the hooks 5 to again securely hold the cover in its closed position. This operation is repeated at the teller's end of the system where the other end of the carrier will be opened. FIGURE 9 schematically shows the position of an open carrier at a customer's station 79 and a teller's station 80. Only one carrier can be used in this system at a time.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A pneumatic tube system comprising: a forwarding tube; stations in said forwarding tube; a captive carrier in said forwarding tube including a cover on one side of said carrier pivotally mounted at both ends on said carrier and locking means at each end of said carrier responsive to forces in at least two directions for opening said cover at either of its ends; means for pneumatically controlling the movement of said carrier; and cooperating means at said stations including means for applying at least two forces in desired directions to said carrier at desired positions on said carrier to cause said locking means at a desired end of said carrier to release said cover.

2. A system according to claim 1 wherein said cover comprises shafts at both its ends and further comprising means for pivotally connecting said cover to said carrier comprising at each end of said carrier: a first member including at least one hook adapted to engage said shafts, means for pivotally mounting said first members so that said hooks at each end can be moved into and out of a position at which they can engage the shaft associated with their respective end of the carrier, a second member including at least one fork adapted to engage said shafts, means for mounting said second members so that said forks can be moved toward said positions for engaging the shafts associated therewith, means urging said second members toward said position so that said forks and said hooks are so positioned during their mutual engagement with said shafts that said shafts cannot be moved out of engagement with said forks or said hooks at either end of said carrier without moving the forks at one end opposite to said urging force and said hooks at said one end away from said position at said one end simultaneously.

3. A system according to claim 2 wherein said hooks and forks being mounted to engage the shafts on opposite sides thereof with the hooks engaging the outer faces thereof, and said cooperating means comprises a roller, means for controlling the movement of said roller so that it presses against said cover forcing the shafts out of engagement with said hooks and moving said forks away from said positions for a predetermined time, a plunger, and means for controlling the movement of said plunger in cooperation with the movement of said roller whereby during said predetermined time said plunger moves a desired one of said first members to bring the hooks of said desired first member away from said position with which it is associated so that the shaft at that end of the carrier may be disengaged from said forks and said hooks after said predetermined time.

4. A system according to claim 3 wherein said stations comprise doors and each said means for controlling the movement of said rollers cooperates with said doors and comprises:

(a) means for pivotally connecting said roller to said door;
(b) means for resiliently holding said pivotally connected roller adjacent said door;
(c) and guiding means for causing said roller to move in a predetermined path when said door moves.

5. Apparatus according to claim 4 wherein said means for pivotally mounting said roller comprises bars and said guiding means comprises at least one extension on said bars and at least one cam which cooperates with said extension.

6. A pneumatic tube carrier comprising: a receptacle; a cover for said receptacle having a shaft on one end thereof; means for locking said cover to said carrier including a first member comprising at least one hook adapted to engage said shaft, means for mounting said first member for movement of said hook towards and away from a position at which said hook can engage said shaft, a second member comprising at least one fork adapted to engage said shaft, means for mounting said second member for movement of said fork towards and away from said position, means urging said second member towards said position so that said fork can engage said shaft to urge it into said hook, said shaft being so disposed with respect to said cover that movement of said cover towards said carrier moves said fork away from said position, and means for moving said hook away from said position whereby only movement of said hook away from said position during movement of said fork away from said position will disengage said shaft from said locking means.

7. A carrier according to claim 6 wherein said forks and said hooks at each end are adapted to cooperate during engagement with said shaft at each end to form bearings for said shafts.

8. A pneumatic tube carrier comprising a receptacle, a cover for said receptacle,
means for locking said cover including a catch adapted to be moved into locking position relative to said cover in which position the catch is mutually interlocked with said cover so as to prevent the catch from being moved out of said locking position,
means responsive to an applied first force in one direction external to the carrier for releasing the catch so as to enable the catch to be moved out of locking position,
and means responsive to a second applied external force from the opposite direction, effective solely during the time the first force is being applied, to move the catch out of locking position.

9. A carrier according to claim 8 further comprising means for urging said cover away from said receptacle when said locking means are opened.

10. A pneumatic tube carrier according to claim 8 wherein said means for releasing the catch includes means responsive to the inward movement of at least a part of said cover under the impetus of said first-mentioned force for releasing said catch.

11. A pneumatic tube carrier according to claim 10 wherein said catch includes a hook and said catch-releasing means includes a shaft fixed to said cover which is mutually locked with said hook when the cover is locked and the hook is in said locking position.

12. A pneumatic tube carrier comprising a receptacle, a cover for said receptacle, disconnectable means for pivotally connecting said cover to said carrier at both ends of said cover including at each end of said cover a catch adapted to be moved into locking position relative to said cover in which position the catch is mutually interlocked with said cover so as to prevent the catch from being moved out of said locking position,
means responsive to an applied first force in one direction external to the carrier for releasing the catch so as to enable the catch to be moved out of locking position,
and means responsive to an applied second force external to the carrier from the opposite direction, effective solely during the time the first force is being applied, to move the catch out of locking position.

13. A pneumatic tube carrier comprising a receptacle, a cover for said receptacle including shafts at both ends of said cover and disconnectable means for pivotally connecting said cover to said carrier at both ends of said cover, which means cooperates with said shafts including towards each end of said cover:
- a catch adapted to be moved into locking position relative to said cover in which position the catch is mutually interlocked with said shaft so as to prevent the catch from being moved out of said locking position,
- means responsive to an applied first force in one direction external to the carrier for releasing the catch so as to enable the catch to be moved out of locking position,
- and means responsive to an applied second force external to the carrier from the opposite direction, effective solely during the time the first force is being applied, to move the catch out of locking position.

14. A pneumatic tube carrier comprising a receptacle, a cover for said receptacle including shafts at both ends of said cover and disconnectable means for pivotally connecting said cover to said carrier at both ends of said cover, which means cooperates with said shafts including towards each end of said cover:
- a first member including at least one hook adapted to engage said shafts,
- means for pivotally mounting said first members so that said hooks at each end can be moved into and out of a position at which they can engage the shaft associated with their respective end of the carrier,
- a second member including at least one fork adapted to engage said shafts,
- means for mounting said second members so that said forks can be moved toward said positions where they can engage the shafts associated therewith,
- means urging said second members toward said positions so that said forks and said hooks are so positioned during their mutual engagement with said shafts that said shafts cannot be moved out of engagement with said forks or said hooks at either end of said carrier without moving the forks at one end opposite to said urging force and said hooks at said one end away from said position at said one end simultaneously,
- end plates at each end of said carrier,
- said second members including slots and said means for mounting said second members including support members disposed in said slots and mounted to said end plates whereby said second members are slidably mounted adjacent said end plates for parallel movement thereto,
- said first members comprising a U-shaped bar having hooked portions at the ends of said U,
- and said means for pivotally mounting said first members comprising pivotally mounted plates disposed perpendicular to said end plates, the bottoms of said U-shaped members being rigidly attached to said pivotally mounted plates,
- and means for resiliently controlling the position of said hooks comprising springs and means for causing said springs to exert a downward force on said bottoms of said U-shaped members so that said U-shaped members will be disposed parallel to said end plates.

References Cited by the Examiner

UNITED STATES PATENTS

| | | | |
|---|---|---|---|
| 505,480 | 9/1893 | Pletcher | 16—147 |
| 1,183,464 | 5/1916 | Johnson. | |
| 1,431,040 | 10/1922 | Rawlings. | |
| 1,552,132 | 9/1925 | Frasch | 292—127 |
| 1,694,023 | 12/1928 | Suck | 292—117 |
| 2,175,534 | 10/1939 | Loftin | 292—127 |
| 2,653,509 | 9/1953 | Nineberg | 220—34 |
| 2,763,446 | 9/1956 | Hanson | 243—34 |
| 2,888,288 | 5/1959 | Rigaud | 292—52 |
| 2,934,285 | 4/1960 | Niehaus | 243—34 |
| 3,080,136 | 3/1963 | Kelley | 243—34 |

FOREIGN PATENTS

| | | |
|---|---|---|
| 627,082 | 9/1961 | Canada. |

SAMUEL F. COLEMAN, *Primary Examiner.*